United States Patent
Andrews et al.

(10) Patent No.: US 10,698,606 B2
(45) Date of Patent: Jun. 30, 2020

(54) HOST AWARE STORAGE TIERING

(71) Applicant: LENOVO ENTERPRISE SOLUTIONS (SINGAPORE) PTE. LTD., Singapore (SG)

(72) Inventors: Shawn C. Andrews, Youngsville, NC (US); David W. Cosby, Raleigh, NC (US); Theodore B. Vojnovich, Raleigh, NC (US)

(73) Assignee: Lenovo Enterprise Solution (Singapore) Pte. Ltd., Singapore (SG)

( * ) Notice: Subject to any disclaimer, the term of this patent is extended or adjusted under 35 U.S.C. 154(b) by 183 days.

(21) Appl. No.: 15/251,016

(22) Filed: Aug. 30, 2016

(65) Prior Publication Data

US 2018/0059952 A1    Mar. 1, 2018

(51) Int. Cl.
*G06F 3/06* (2006.01)
*H04L 29/08* (2006.01)

(52) U.S. Cl.
CPC .......... *G06F 3/0605* (2013.01); *G06F 3/0649* (2013.01); *G06F 3/0659* (2013.01); *G06F 3/0685* (2013.01); *H04L 67/141* (2013.01)

(58) Field of Classification Search
CPC .... G06F 3/0646; G06F 3/0647; G06F 3/0649; G06F 3/0659; G06F 3/0685; G06F 3/0605; G06F 3/06; H04L 67/141

USPC .......................................... 711/154, 117, 165
See application file for complete search history.

(56) References Cited

U.S. PATENT DOCUMENTS

| | | | |
|---|---|---|---|
| 9,898,224 B1* | 2/2018 | Marshak | G06F 3/0604 |
| 2008/0177948 A1* | 7/2008 | Mimatsu | G06F 16/119 |
| | | | 711/117 |
| 2012/0215949 A1* | 8/2012 | Chiu | G06F 3/0617 |
| | | | 710/18 |
| 2013/0117515 A1* | 5/2013 | Ashmore | G06F 12/16 |
| | | | 711/162 |
| 2014/0095790 A1* | 4/2014 | Chambliss | G06F 12/0897 |
| | | | 711/117 |
| 2014/0351515 A1* | 11/2014 | Chiu | G06F 3/0605 |
| | | | 711/117 |
| 2015/0205525 A1* | 7/2015 | Chiu | G06F 3/061 |
| | | | 711/162 |

* cited by examiner

*Primary Examiner* — Pierre Miche Bataille

(57) ABSTRACT

Host aware storage tiering including receiving, by a storage controller on a storage server, a disconnect signal indicating an end of a first client session for a client, wherein the first client session comprises accesses to a plurality of data blocks on the storage server; determining, by the storage controller, that at least one data block of the plurality of data blocks was moved to a first tier storage during the first client session; storing, by the storage controller, an indication that the at least one data block was moved to the first tier storage; receiving a connect signal indicating a beginning of a second client session for the client; and moving, in response to the connect signal, the at least one data block into the first tier storage.

17 Claims, 6 Drawing Sheets

HOST AWARE STORAGE TIERING

BACKGROUND

Field of the Invention

The field of the invention is data processing, or, more specifically, methods, apparatus, and products for host aware storage tiering.

Description of Related Art

Modern storage systems may include different types of physical media with different performance metrics. Generally, high performance storage has a higher associated cost, and is therefore used more sparingly than lower performance, lower cost storage. Multiple tiers of storage, each with different performance metrics, may be implemented by storage systems such that the data that is accessed frequently may be promoted to a high performance tier. However, storage tiering must balance the performance demand of host applications with the cost of high performance storage.

SUMMARY

Methods, systems, and apparatus for host aware storage tiering are disclosed in this specification. Host aware storage tiering includes receiving, by a storage controller on a storage server, a disconnect signal indicating an end of a first client session for a client, wherein the first client session comprises accesses to a plurality of data blocks on the storage server; determining, by the storage controller, that at least one data block of the plurality of data blocks was moved to a first tier storage during the first client session; storing, by the storage controller, an indication that the at least one data block was moved to the first tier storage; receiving a connect signal indicating a beginning of a second client session for the client; and moving, in response to the connect signal, the at least one data block into the first tier storage.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
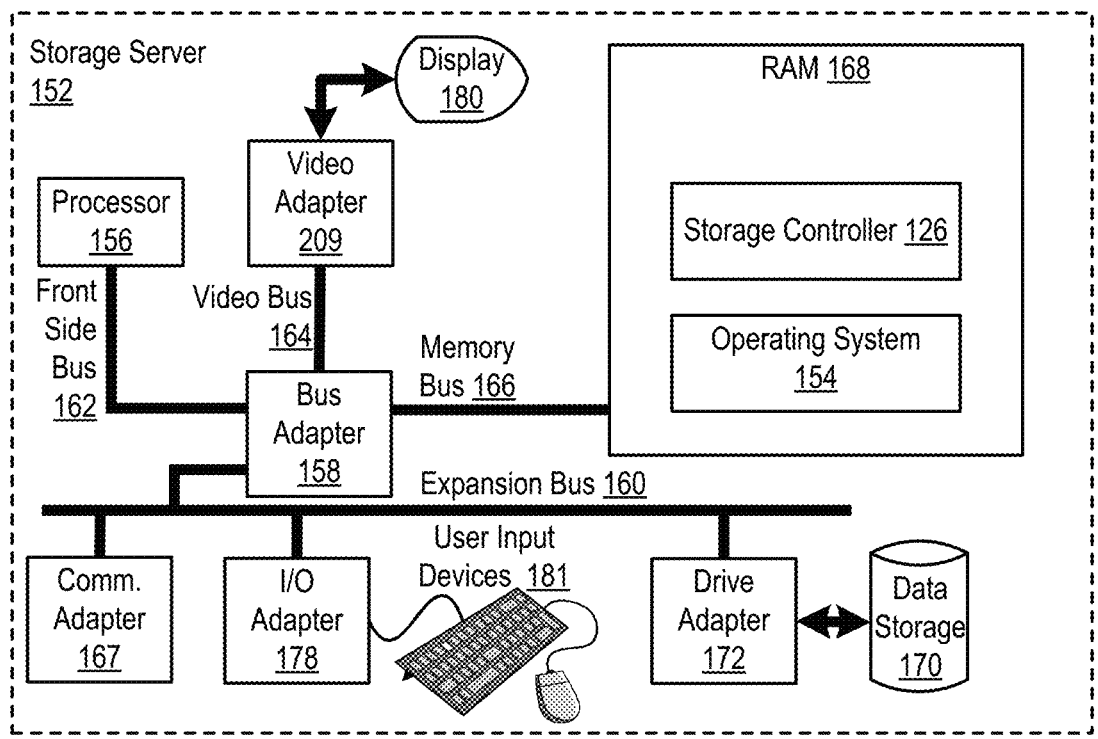
FIG. 1 sets forth a block diagram of an example system configured for host aware storage tiering according to embodiments of the present invention.

Exemplary methods, apparatus, and products for host aware storage tiering in accordance with the present invention are described with reference to the accompanying drawings, beginning with FIG. 1. FIG. 1 sets forth a block diagram of automated computing machinery comprising an exemplary storage server (152) configured for host aware storage tiering according to embodiments of the present invention. The storage server (152) of FIG. 1 includes at least one computer processor (156) or 'CPU' as well as random access memory (168) ('RAM') which is connected through a high speed memory bus (166) and bus adapter (158) to processor (156) and to other components of the storage server (152).

Stored in RAM (168) is an operating system (154). Operating systems useful in computers configured for host aware storage tiering according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) is the storage controller (126), a module of computer program instructions for host aware storage tiering.

The storage server (152) of FIG. 1 includes disk drive adapter (172) coupled through expansion bus (160) and bus adapter (158) to processor (156) and other components of the storage server (152). Disk drive adapter (172) connects non-volatile data storage to the storage server (152) in the form of disk drive (170). Disk drive adapters useful in computers configured for host aware storage tiering according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example storage server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example storage server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary storage server (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for host aware storage tiering according to embodiments of the present invention include modems for wired dial-up communications, Ethernet (IEEE 802.3) adapters for wired data communications, and 802.11 adapters for wireless data communications.

Figure 2:
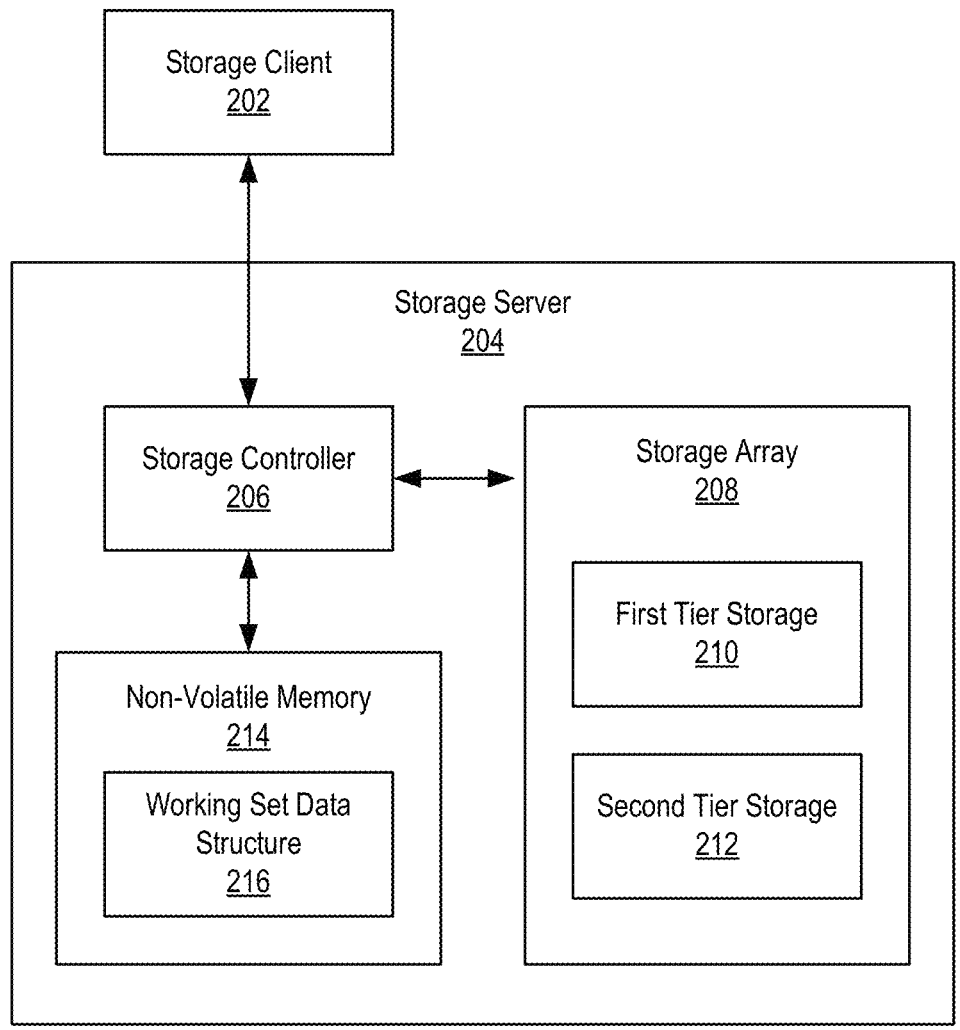
FIG. 2 sets forth a block diagram for host aware storage tiering according to embodiments of the present invention.

FIG. 2 is an example block diagram of a system configured for host aware storage tiering. FIG. 2 includes a storage client (202), a storage controller (206), a storage array (208) that includes a first tier storage (210) and a second tier storage (212), and a non-volatile memory (214) that includes a working set data structure (216).

The storage client (202) is an entity that participates in a client session with the storage server (204). During the client session, the storage client (202) accesses data stored in data blocks on the storage array (208) within the storage server (204). The storage client (202) may be a computing system operated by a human being or an application executing on the computing system. A client session may begin when the storage client (202) logs in to the storage server (204) or otherwise establishes a connection to the storage server (204). The client session may end when the storage client (202) logs out of the storage server (204) or otherwise terminates a connection to the storage server (204). The term "session" refers to a series of accesses over a contiguous or near-contiguous period of time during which the time between accesses or communications does not exceed a timeout period (thus ending the session). Each session may be authenticated by verifying the identity of the client (user or application) that is requesting access.

A connect signal is a notification to the storage controller (206) that a storage client (202) is beginning a session, will begin a session in the near future, or has recently begun a session. Connect signals may be a variety of different types of notifications. For example, a connect signal may be a notification that a storage client (202) has initiated or reestablished a client session by logging in to the storage server (204). As another example, a connect signal may indicate that, based on the connection history of a storage client (202), that storage client (202) is expected to log in in the near future. Further, a connect signal may be a direct notification to the storage controller (206) of the connection establishment by other elements on the storage server (204).

A disconnect signal is a notification to the storage controller (206) that a storage client (202) is ending a session, will end a session in the near future, or has recently ended the session. Disconnect signals may be a variety of different types of notifications. For example, a disconnect signal may be a notification that a storage client (202) has terminated or suspended a client session by logging out of the storage server (204). As another example, a disconnect signal may indicate that, based on the connection history of a storage client (202), that storage client (202) is expected to log out in the near future. Further, a disconnect signal may be a direct notification to the storage controller (206) of the connection termination by other elements on the storage server (204).

The storage server (204) is a computing system or group of computing systems configured to provide access to data stored in data blocks. The data provided by the storage server (204) may be stored within a storage array (208). The storage server includes a storage controller (206) that provides storage clients (202) access to the data stored in the storage array (208). The storage controller may be configured to monitor the storage client (202) accesses to the storage array (208) and to organize the storage array (208) to improve efficiency. The storage controller (206) may be, for example, a RAID controller.

The storage array (208) may include one or more disks upon which data is stored. The storage array (208) may be made of up multiple disks and types of disks. The storage array (208) may be within the storage server (204) (e.g., within the data storage (170) in FIG. 1), coupled to the storage server (204) (e.g., via the communications adapter (167) in FIG. 1), or a combination of both.

The storage array (208) includes at least two types of storage media, a first tier storage (210) and a second tier storage (212). The first tier storage (210) is distinguished from the second tier storage (212) in that the first tier storage (210) has improved performance relative to the second tier storage (212). For example, the first tier storage may have lower latency and lower access (i.e., read/write) times relative to the second tier storage. The first tier storage (210) may be more expensive relative to the second tier storage (212), and therefore the storage array (208) may include a greater amount of second tier storage (212) capacity than first tier storage (210) capacity. For example, first tier storage (210) may be one or more solid state drives, and second tier storage (212) may be one or more platter-based drives. Each tier of storage may include multiple physical media and types of physical media. Multiple tiers of storage may also be included in the storage array (208), and the first tier storage (210) and the second tier storage (212) may be only two tiers among many.

The data stored on the storage array (208) may be divided in data blocks. Data blocks may be different sized portions of data, such as 4 kilobytes, 12 megabytes, 1 gigabyte, etc. The storage controller (206) may monitor the data accesses of a storage client (202) and move data blocks from second tier storage (212) into first tier storage (210) based on the number of accesses of the data in the data block. Data blocks that are accessed the most, or more than other data blocks (i.e., "hot data") may be moved into first tier storage (210) in order to improve performance for subsequent accesses of that data. As used herein, the term "move" refers to a copy and delete operation (i.e., maintaining a single copy of the data), and does not include copying data into a data cache while maintaining the original data in other memory.

In order to determine which data blocks to move from second tier storage (212) into first tier storage (210), the storage controller (206) gathers metadata describing the data accesses made by each storage client (202). This metadata is referred to as working set data, and is stored for each client in the working set data structure (216). The working set data structure (216) may store a count of each storage client (202) access to each data block within the storage array (208). Once a count for a data block reaches a threshold, the storage controller (206) may move that data block from second tier storage (212) to first tier storage (210). The threshold may be an absolute threshold (e.g., at least 10 accesses, at least 5 accesses per minute, etc.) or a relative threshold (e.g., the three most accessed data blocks are moved to first tier storage). The storage controller (206) may maintain the access count across sessions, or may only store the access count of the previous session or set of most recent sessions.

The working set data structure (216) may also store information about the data blocks that are moved from second tier storage (212) to first tier storage (210) during the client session. For example, the working set data structure (216) may store a list of the data blocks that were in the first tier storage (210) when the most recent session was terminated. Similarly, the working set data structure (216) may store an indicator of the storage tier each data block was stored in at the end of the most recent session.

The working set data structure (216) may also store a usage pattern for each session. For example, working set data structure (216) may also store an indication of the most frequently accessed data blocks at the beginning of each session, so that those data blocks may be moved into first tier storage (210) as each new session begins.

The working set data structure (216) may be stored in non-volatile memory (214). The non-volatile memory (214) may be in a location on the first tier storage or second tier storage that is inaccessible to storage clients (202), or may be in a different storage location on the storage server (204). The non-volatile memory may be on a second storage server, accessible to the storage controller (206) over a communications network.

Figure 3:
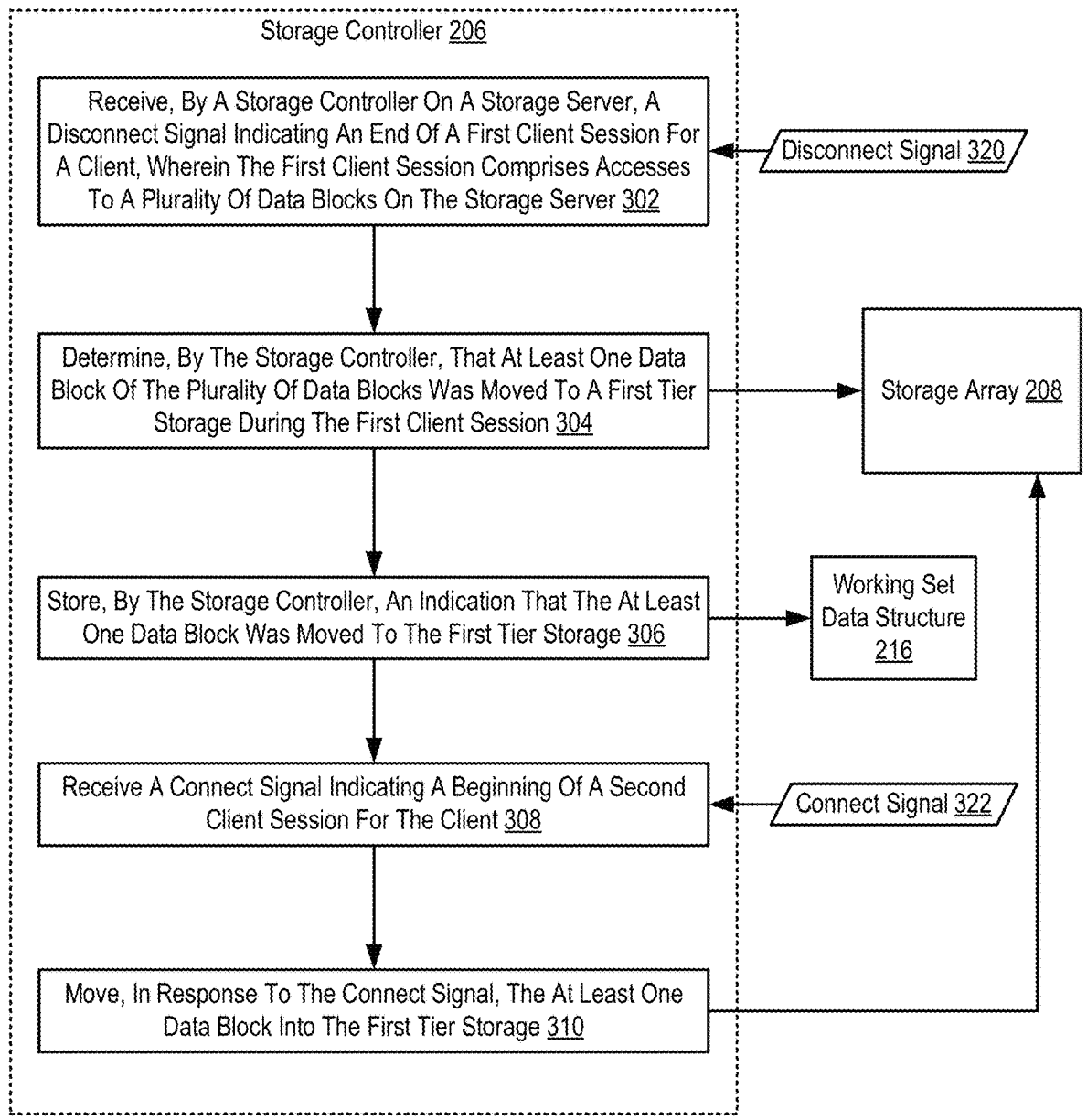
FIG. 3 sets forth a flow chart illustrating an exemplary method for host aware storage tiering according to embodiments of the present invention.

For further explanation, FIG. 3 sets forth a flow chart illustrating an exemplary method for host aware storage tiering according to embodiments of the present invention. The method of FIG. 3 includes receiving (302), by a storage controller (206) on a storage server, a disconnect signal (320) indicating an end of a first client session for a client (202), wherein the first client session comprises accesses to a plurality of data blocks on the storage server (204). Receiving (302), by a storage controller (206) on a storage server, a disconnect signal (320) indicating an end of a first client session for a client (202), wherein the first client session comprises accesses to a plurality of data blocks on the storage server (204) may be carried out by detecting a condition that indicates the first client session has ended or will end in the near future. The disconnect signal (320) may include an identifier of the storage client, such as a user name, session ID, or world wide name. For example, a storage client may initiate a log off procedure by terminating the current session. The storage controller (206) may be notified that a storage client with user name "X" has terminated the current session.

During the first client session, the storage client may access data from a number of different data blocks. The storage controller (206) may track the number of accesses (e.g., the number of data requests) targeting each data block. Based on the number of accesses, the storage controller (206) may move the data block from second tier storage to first tier storage in order to increase the performance of subsequent accesses to that data block. The storage controller (206) may further track which data blocks were placed in first tier storage during each session or the most recent session. Receiving the disconnect signal (320) may trigger the storage controller (206) to gather metadata (i.e., working set data) about the current state of the first tier storage utilized by the client (e.g., identifiers of the data blocks currently stored in the fast tier storage).

The method of FIG. 3 also includes determining (304), by the storage controller (206), that at least one data block of the plurality of data blocks was moved to a first tier storage (210) during the first client session. Determining (304), by the storage controller (206), that at least one data block of the plurality of data blocks was moved to a first tier storage (210) during the first client session may be carried out by determining which, if any, data blocks were moved from second tier storage into first tier storage within the storage array (208) during the first client session. The storage controller (206) may inspect the first tier storage upon receiving the disconnect signal to determine which data blocks were moved into the first tier storage during the first client session.

Determining (304), by the storage controller (206), that at least one data block of the plurality of data blocks was moved to a first tier storage (210) during the first client session may also be carried out by accessing the working set data for the session or client and determining whether the metadata stored in the working set data structure (216) indicates that at least one data block was moved into first tier storage. The working set data structure (216) may include a list of the data blocks that were moved into first tier storage during the session.

For example, if storage client A accesses data block X a threshold number of times during the first client session for client A, the storage controller (206) moves data block X from the second tier storage into the first tier storage. When storage client A disconnects from the storage server, the storage controller (206) is notified of the disconnection via a disconnect signal. Upon receiving the disconnect signal, the storage controller (206) examines the first tier storage and/or the working set data structure to determine that data block X was stored in the first tier storage.

The method of FIG. 3 also includes storing (306), by the storage controller (206), an indication that the at least one data block was moved to the first tier storage (210). Storing (306), by the storage controller (206), an indication that the at least one data block was moved to the first tier storage (210) may be carried out by storing, in the working set data structure (216), metadata describing the data blocks moved to first tier storage. The storage controller (206) may store the state of the storage tiers at or near the time the client disconnected from the storage server. The metadata describing the one or more data blocks stored in the first tier storage may alternatively be stored in a data structure separate from the data structure used to store the metadata describing the accesses to each data block.

For example, upon receiving the disconnect signal, the storage controller (206) may determine that data block X, data block Y, and data block Z were stored in first tier storage. The storage controller (206) may then store, in the working set data structure, an indication that data block X, data block Y, and data block Z were in the first tier storage at the time of disconnect. The metadata about the data block Y, and data block Z may be associated with the storage client, the client session, or another identifier of the client or session (e.g., a world wide name).

Alternatively, or additionally, the storage controller (206) may store an access count for each data block. The access count includes metadata describing the number of times the data blocks are accessed, either across a number of sessions or the most recent session. The access count may be used by the storage controller (206) to determine the data blocks to move into first tier storage at the beginning of the next client session.

Alternatively, or additionally, the storage controller (206) may store a pattern of access for each data block accessed by the client during each, or the most recent, session. Such a stored pattern may indicate at which point during the session that each frequently-accessed data block was accessed. For example, data blocks A, B, and C may be frequently accessed during the first 30 minutes of each session, and data blocks X, Y, and Z may be frequently accessed during the second 30 minutes of each session. The storage controller (206) may then store metadata indicating that during the first 30 minutes of the session, data blocks A, B, and C should be moved into first tier storage, and during the second 30 minutes of the session, data blocks X, Y, and Z should be moved into first tier storage.

The method of FIG. 3 also includes receiving (308) a connect signal (322) indicating a beginning of a second client session for the client (202). Receiving (308) a connect signal (322) indicating a beginning of a second client session for the client (202) may be carried out by detecting a condition that indicates the second client session has begun or will begin in the near future. The connect signal (322) may include an identifier of the storage client, such as a user name, session ID, or world wide name. For example, a storage client may initiate a log on procedure by submitting identifying credentials. The storage controller (206) may be notified that a storage client with user name "X" has initiated a new session.

The method of FIG. 3 also includes moving (310), in response to the connect signal (322), the at least one data block into the first tier storage (210). Moving (310), in response to the connect signal (322), the at least one data block into the first tier storage (210) may be carried out by copying the data block from second tier storage and deleting the data block from second tier storage. Moving (310), in response to the connect signal (322), the at least one data block into the first tier storage (210) may also be carried out by determining that an entry for the client exists in a working set data structure (216), and moving the at least one data block identified by the entry from the second tier storage to the first tier storage.

Figure 4:
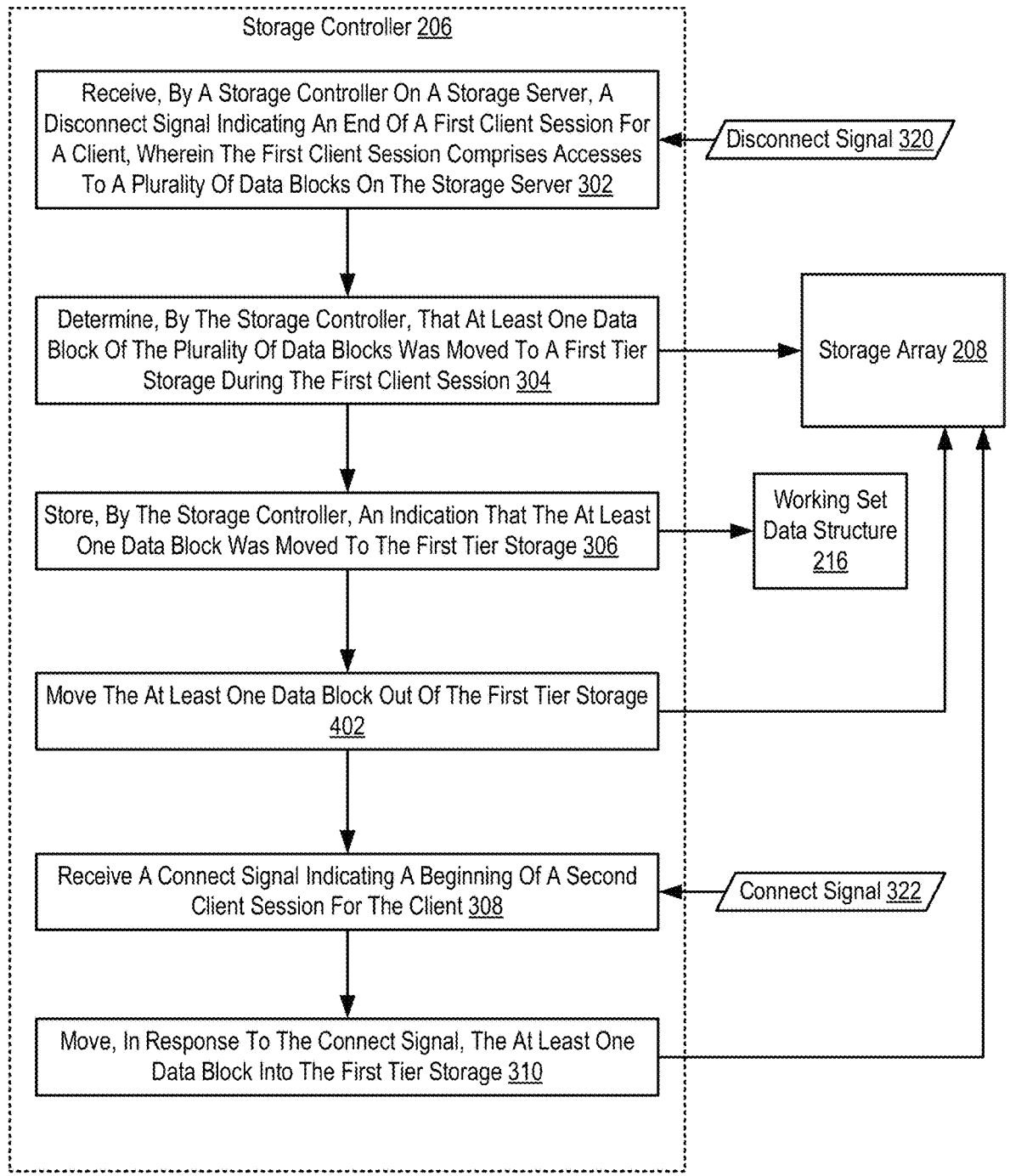
FIG. 4 sets forth a flow chart illustrating an exemplary method for host aware storage tiering according to embodiments of the present invention.

For further explanation, FIG. 4 sets forth a flow chart illustrating an exemplary method for host aware storage tiering according to embodiments of the present invention that includes receiving (302), by a storage controller (206) on a storage server, a disconnect signal (320) indicating an end of a first client session for a client (202), wherein the first client session comprises accesses to a plurality of data blocks on the storage server (204); determining (304), by the storage controller (206), that at least one data block of the plurality of data blocks was moved to a first tier storage (210) during the first client session; storing (306), by the storage controller (206), an indication that the at least one data block was moved to the first tier storage (210); receiving (308) a connect signal (322) indicating a beginning of a second client session for the client (202); and moving (310), in response to the connect signal (322), the at least one data block into the first tier storage (210).

The method of FIG. 4 differs from the method of FIG. 3, however, in that FIG. 4 includes moving (402) the at least one data block out of the first tier storage. Moving (402) the at least one data block out of the first tier storage may occur after the storage controller (206) has received the disconnect signal (320) for the first client session and before the storage controller (206) has received the connect signal (322) for the second client session.

Moving (402) the at least one data block out of the first tier storage may be carried out by copying the data block to the second tier storage and deleting the storage block from the first tier storage. Moving (402) the at least one data block out of the first tier storage may be performed in response to an attempt to move a different data block into the first tier storage (e.g., as part of an unrelated client session) and determining that the first tier storage does not have enough space to store the different data block.

For example, during a client session for a client "Alice", data blocks A, B, and C may be moved in to first tier storage. After Alice terminates the first client session, another client "Bob" initiates a client session. During Bob's client session, the storage controller (206) determines that data blocks X, Y, and Z should be moved into first tier storage. However, the storage controller (206) may also determine that there is not enough space in the first tier storage to move data blocks X, Y, and Z. Therefore, the storage controller (206) may move one or more of data blocks A, B, and C out of the first tier storage and into the second tier storage, in order to make room for data blocks X, Y, and Z.

Figure 5:
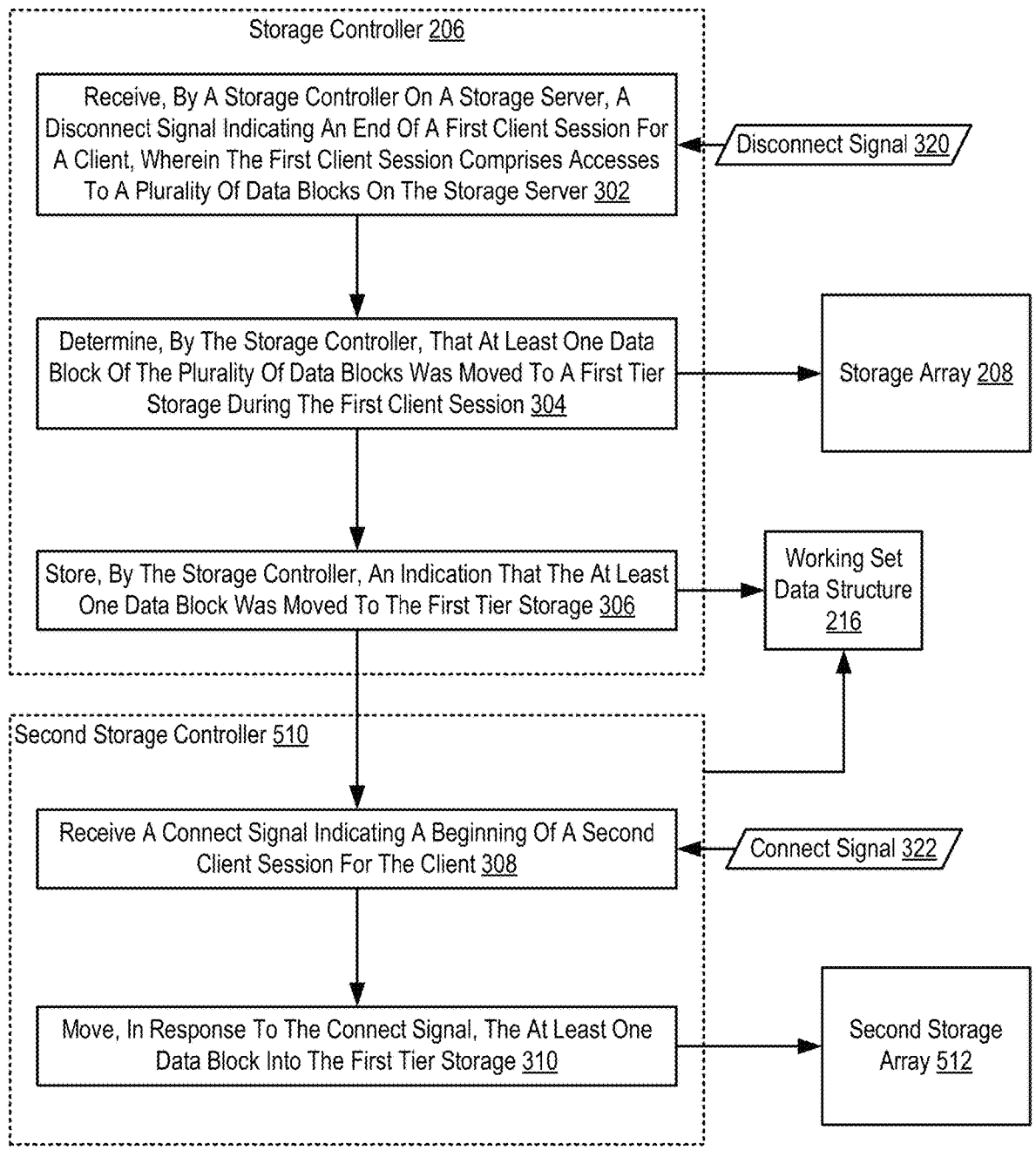
FIG. 5 sets forth a flow chart illustrating an exemplary method for host aware storage tiering according to embodiments of the present invention.

For further explanation, FIG. 5 sets forth a flow chart illustrating an exemplary method for host aware storage tiering according to embodiments of the present invention that includes receiving (302), by a storage controller (206) on a storage server, a disconnect signal (320) indicating an end of a first client session for a client (202), wherein the first client session comprises accesses to a plurality of data blocks on the storage server (204); determining (304), by the storage controller (206), that at least one data block of the plurality of data blocks was moved to a first tier storage (210) during the first client session; storing (306), by the storage controller (206), an indication that the at least one data block was moved to the first tier storage (210); receiving (308) a connect signal (322) indicating a beginning of a second client session for the client (202); and moving (310), in response to the connect signal (322), the at least one data block into the first tier storage (210).

The method of FIG. 5 differs from the method of FIG. 3, however, in that receiving (308) a connect signal (322) indicating a beginning of a second client session for the client (202); and moving (310), in response to the connect signal (322), the at least one data block into the first tier storage (210) are performed by a second storage controller (510) providing access to data on a second storage array (512). The storage server may include multiple mirrors of data to facilitate access to the data by a large number of clients. Each storage controller (206, 510) may utilize the same working set data structure (216) in order to track the data blocks most accessed by a client regardless of which storage array mirror the client is logged in to. Although FIG. 5 shows both storage controllers (206, 510) accessing the same working set data structure (216), the working set data structure (216) may also be mirrored, and the storage controllers (206, 510) may each access separate but synchronized copies of the working set data structure (216).

For example, a client application "Alice" may log into the storage server and be directed to a first mirror, "mirror A" using storage controller A (206). Once Alice logs out, storage controller A may determine that data blocks A, B, and C were stored in the first tier storage on a first storage array (208) at the end of Alice's client session, and storage controller A (206) records that metadata in the working set data structure (216). At a later time, the client application Alice may log in to the storage server and be directed to a second mirror "mirror B" using storage controller B (510). Upon receiving the connect signal (322), storage controller B (510) accesses the working set data structure (216) and searches for entries matching the client application Alice. Storage controller B (510) then determines that data blocks A, B, and C were stored in the first tier storage at the end of the previous client session for Alice. Storage controller B (510) then moves data blocks A, B, and C in to the first tier storage on the second storage array (512) for mirror B.

Figure 6:
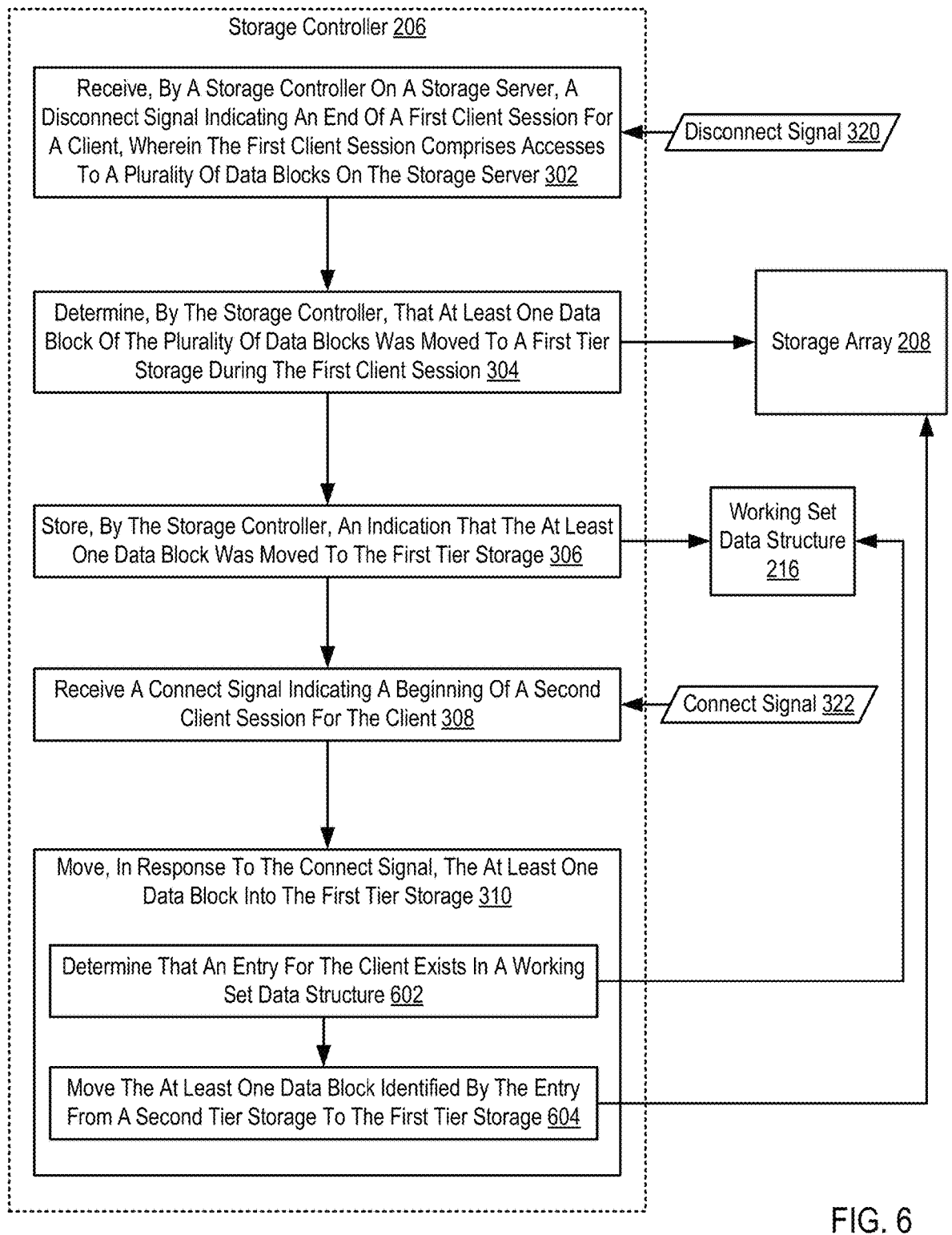
FIG. 6 sets forth a flow chart illustrating an exemplary method for host aware storage tiering according to embodiments of the present invention.

For further explanation, FIG. 6 sets forth a flow chart illustrating an exemplary method for host aware storage tiering according to embodiments of the present invention that includes receiving (302), by a storage controller (206) on a storage server, a disconnect signal (320) indicating an end of a first client session for a client (202), wherein the first client session comprises accesses to a plurality of data blocks on the storage server (204); determining (304), by the storage controller (206), that at least one data block of the plurality of data blocks was moved to a first tier storage (210) during the first client session; storing (306), by the storage controller (206), an indication that the at least one data block was moved to the first tier storage (210); receiving (308) a connect signal (322) indicating a beginning of a second client session for the client (202); and moving (310), in response to the connect signal (322), the at least one data block into the first tier storage (210).

The method of FIG. 6 differs from the method of FIG. 3, however, in that moving (310), in response to the connect signal (322), the at least one data block into the first tier storage (210) includes determining (602) that an entry for the client exists in a working set data structure (216), and moving (604) the at least one data block identified by the entry from a second tier storage to the first tier storage. Determining (602) that an entry for the client exists in a working set data structure (216) may be carried out by searching the working set data structure (216) using a client identifier, session identifier, or world wide name as a key. If at least one entry matches the key, then the entry in the working set data structure (216) exists.

Determining (602) that an entry for the client exists in a working set data structure (216) may also be carried out by determining whether any entry in the working set data structure (216) for the client or session includes metadata describing one or more data blocks that should be placed in the first tier storage. The working set data structure (216) may include an entry for a client or session, but may not yet have stored enough information to determine which data blocks should be placed in first tier storage.

Moving (604) the at least one data block identified by the entry from a second tier storage to the first tier storage may be carried out by identifying a data block referred to in the entry, and copying the identified data block into first tier storage from second tier storage and deleting the identified data block from second tier storage.

In view of the explanations set forth above, readers will recognize that the benefits of host aware storage tiering according to embodiments of the present invention include:
- Improving the operation of a computer system by maintaining tiering information across client sessions, increasing storage access efficiency.
- Improving the operation of a computer system by recreating the configuration of data blocks within storage tiers at the beginning of each client session, increasing storage access efficiency.
- Improving the operation of a computer system by maintaining tiering information across storage mirrors, increasing storage access efficiency.

Exemplary embodiments of the present invention are described largely in the context of a fully functional computer system for host aware storage tiering. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for host aware storage tiering, the method comprising:
    determining, by a storage controller, that an access count for at least one data block of a plurality of data blocks reaches a threshold;
    moving, by a storage controller on a storage server, in response to the access count for at least one data block of a plurality of data blocks reaching the threshold, during a first client session for a client, the at least one data block from a second tier storage to a first tier storage, wherein the first client session comprises accesses to a plurality of data blocks on the storage server;
    receiving, by the storage controller, a disconnect signal indicating an end of the first client session;
    determining, by the storage controller, that at least one data block of the plurality of data blocks was moved from the second tier storage to the first tier storage during the first client session;
    storing, by the storage controller, an indication that the at least one data block was moved from the second tier storage to the first tier storage during the first client session;
    receiving a connect signal indicating a beginning of a second client session for the client, wherein the at least one data block is moved out of the first tier storage after the storage controller receives the disconnect signal and prior to the storage controller receiving the connect signal; and
    moving, in response to the connect signal indicating the beginning of the second client session for the client and the indication that the at least one data block was moved from the second tier storage to the first tier storage during the first client session, the at least one data block into the first tier storage for the second client session.

2. The method of claim 1, wherein the at least one data block is moved, during the first client session, to the first tier storage from a second tier storage,
    wherein the first tier storage has lower latency access than the second tier storage, and
    wherein the at least one data block is moved by the storage controller based on a number of data requests, by the client, targeting the at least one data block.

3. The method of claim 1, wherein the at least one data block is moved out of the first tier storage during a third client session for a second client.

4. The method of claim 1, wherein second client session is beginning on a second storage server,
    wherein receiving the connect signal indicating the beginning of the second client session for the client comprises receiving the connect signal by a storage controller on the second storage server, and
    wherein moving, in response to the connect signal, the at least one data block into the first tier storage comprises moving a copy of the at least one data block into the first tier storage on the second storage server.

5. The method of claim 1, wherein moving, in response to the connect signal, the at least one data block into the first tier storage comprises:

determining that an entry for the client exists in a working set data structure in non-volatile computer memory, and moving the at least one data block identified by the entry from a second tier storage to the first tier storage.

6. The method of claim 1, wherein the accesses, by the client, to the plurality of data blocks on the storage server comprise accesses to at least one data block in a second tier storage.

7. An apparatus for host aware storage tiering, the apparatus comprising a computer processor, a computer memory operatively coupled to the computer processor, the computer memory having disposed within it computer program instructions that, when executed by the computer processor, cause the apparatus to carry out the steps of:

determining, by a storage controller, that an access count for at least one data block of a plurality of data blocks reaches a threshold;

moving, by a storage controller on a storage server, in response to the access count for at least one data block of a plurality of data blocks reaching the threshold, during a first client session for a client, the at least one data block from a second tier storage to a first tier storage, wherein the first client session comprises accesses to a plurality of data blocks on the storage server;

receiving, by the storage controller, a disconnect signal indicating an end of the first client session;

determining, by the storage controller, that at least one data block of the plurality of data blocks was moved from the second tier storage to the first tier storage during the first client session;

storing, by the storage controller, an indication that the at least one data block was moved from the second tier storage to the first tier storage during the first client session;

receiving a connect signal indicating a beginning of a second client session for the client, wherein the at least one data block is moved out of the first tier storage after the storage controller receives the disconnect signal and prior to the storage controller receiving the connect signal; and moving, in response to the connect signal indicating the beginning of the second client session for the client and the indication that the at least one data block was moved from the second tier storage to the first tier storage during the first client session, the at least one data block into the first tier storage for the second client session.

8. The apparatus of claim 7, wherein the at least one data block is moved, during the first client session, to the first tier storage from a second tier storage, wherein the first tier storage has lower latency access than the second tier storage, and wherein the at least one data block is moved by the storage controller based on a number of data requests, by the client, targeting the at least one data block.

9. The apparatus of claim 7, wherein the at least one data block is moved out of the first tier storage during a third client session for a second client.

10. The apparatus of claim 7, wherein second client session is beginning on a second storage server, wherein receiving the connect signal indicating the beginning of the second client session for the client comprises receiving the connect signal by a storage controller on the second storage server, and wherein moving, in response to the connect signal, the at least one data block into the first tier storage comprises moving a copy of the at least one data block into the first tier storage on the second storage server.

11. The apparatus of claim 7, wherein moving, in response to the connect signal, the at least one data block into the first tier storage comprises:

determining that an entry for the client exists in a working set data structure in non-volatile computer memory, and moving the at least one data block identified by the entry from a second tier storage to the first tier storage.

12. The apparatus of claim 7, wherein the accesses, by the client, to the plurality of data blocks on the storage server comprise accesses to at least one data block in a second tier storage.

13. A computer program product for host aware storage tiering, the computer program product disposed upon a computer readable medium, the computer program product comprising computer program instructions that, when executed, cause a computer to carry out the steps of:

determining, by a storage controller, that an access count for at least one data block of a plurality of data blocks reaches a threshold;

moving, by a storage controller on a storage server, in response to the access count for at least one data block of a plurality of data blocks reaching the threshold, during a first client session for a client, the at least one data block from a second tier storage to a first tier storage, wherein the first client session comprises accesses to a plurality of data blocks on the storage server;

receiving, by the storage controller, a disconnect signal indicating an end of the first client session;

determining, by the storage controller, that at least one data block of the plurality of data blocks was moved from the second tier storage to the first tier storage during the first client session;

storing, by the storage controller, an indication that the at least one data block was moved from the second tier storage to the first tier storage during the first client session;

receiving a connect signal indicating a beginning of a second client session for the client, wherein the at least one data block is moved out of the first tier storage after the storage controller receives the disconnect signal and prior to the storage controller receiving the connect signal; and moving, in response to the connect signal indicating the beginning of the second client session for the client and the indication that the at least one data block was moved from the second tier storage to the first tier storage during the first client session, the at least one data block into the first tier storage for the second client session.

14. The computer program product of claim 13, wherein the at least one data block is moved, during the first client session, to the first tier storage from a second tier storage, wherein the first tier storage has lower latency access than the second tier storage, and wherein the at least one data block is moved by the storage controller based on a number of data requests, by the client, targeting the at least one data block.

15. The computer program product of claim 13, wherein the at least one data block is moved out of the first tier storage during a third client session for a second client.

16. The computer program product of claim 13, wherein second client session is beginning on a second storage server, wherein receiving the connect signal indicating the beginning of the second client session for the client comprises receiving the connect signal by a storage controller on the second storage server, and wherein moving, in response to the connect signal, the at least one data block into the first tier storage comprises moving a copy of the at least one data block into the first tier storage on the second storage server.

17. The computer program product of claim 13, wherein moving, in response to the connect signal, the at least one data block into the first tier storage comprises:

determining that an entry for the client exists in a working set data structure in non-volatile computer memory, and moving the at least one data block identified by the entry from a second tier storage to the first tier storage.

\* \* \* \* \*